US009026791B2

(12) United States Patent
Avanzi et al.

(10) Patent No.: US 9,026,791 B2
(45) Date of Patent: May 5, 2015

(54) LINEAR FEEDBACK SHIFT REGISTER (LFSR)

(71) Applicant: QUALCOMM Incorporated, San Diego, CA (US)

(72) Inventors: Roberto Avanzi, Munich (DE); Billy B. Brumley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 13/793,710

(22) Filed: Mar. 11, 2013

(65) Prior Publication Data

US 2014/0258721 A1    Sep. 11, 2014

(51) Int. Cl.
*H04W 12/06* (2009.01)
*G06F 7/58* (2006.01)
*H04L 9/06* (2006.01)

(52) U.S. Cl.
CPC ............ *H04W 12/06* (2013.01); *G06F 7/584* (2013.01); *H04L 2209/122* (2013.01); *H04L 9/0668* (2013.01)

(58) Field of Classification Search
None
See application file for complete search history.

(56) References Cited

U.S. PATENT DOCUMENTS

| 5,425,035 | A  | * | 6/1995 | Spence et al. .............. 714/732 |
| 6,763,363 | B1 |   | 7/2004 | Driscoll |
| 6,879,689 | B2 |   | 4/2005 | Carroll et al. |
| 7,945,049 | B2 |   | 5/2011 | Schneider |
| 2002/0138721 | A1 | * | 9/2002 | Kwon et al. .................. 713/151 |
| 2004/0019619 | A1 | * | 1/2004 | Buer et al. .................... 708/254 |
| 2005/0058290 | A1 | * | 3/2005 | Kryzak et al. ................ 380/268 |
| 2005/0185796 | A1 | * | 8/2005 | Lablans ........................ 380/268 |
| 2010/0138630 | A1 | * | 6/2010 | Persson et al. ............... 711/214 |
| 2012/0076293 | A1 |   | 3/2012 | Smith et al. |

FOREIGN PATENT DOCUMENTS

WO    WO-2008016902 A1    2/2008
WO    2009127955 A1    10/2009

OTHER PUBLICATIONS

Kitsos, Paris et al., "An FPGA Implementation of the ZUC Stream Cipher," 2011 14th Euromicro Conference on Digital System Design, pp. 814-817.*
3GPP Task Force: "Specification of the 3GPP Confidentiality and Integrity Algorithms 128-EEA3 & 128-EIA3, Document 2: ZUC Specification," ETSI/SAGE Specification, Jun. 28, 2011, pp. 1-18, XP055121967, Cited in the application the whole document.
Enenkel R.F., et al., "Fast Calculation of Integer Products Modulo 2**31-1 using IEEE Floating Point and Fused Multiply-Add," ip.com Journal, ip.com Inc., West Henrietta, NY, US, Aug. 1, 1998, 3 Pages, XP013111099, ISSN: 1533-0001 the whole document.

(Continued)

*Primary Examiner* — David Le
(74) *Attorney, Agent, or Firm* — Austin Rapp & Hardman

(57) ABSTRACT

A wireless communication device is described. The wireless communication device includes a linear feedback shift register. The linear feedback shift register is initialized. The linear feedback shift register is a word based odd characteristic linear feedback shift register. The linear feedback shift register includes multiple 64-bit registers. A feedback function output is generated using the 64-bit registers. The feedback function output is placed into a highest register of the linear feedback shift register.

47 Claims, 8 Drawing Sheets

(56) References Cited

OTHER PUBLICATIONS

International Search Report and Written Opinion—PCT/US2014/020377—ISA/EPO—Jun. 20, 2014.

Wang L., et al., "Evaluating Optimized Implementations of Stream Cipher ZUC Algorithm on FPGA," Nov. 23, 2011, Information and communications security, Springer Berlin Heidelberg, Berlin, Heidelberg, pp. 202-215, XP019168974, ISBN: 978-3-642-25242-6, pp. 6-11.

* cited by examiner

LINEAR FEEDBACK SHIFT REGISTER (LFSR)

TECHNICAL FIELD

The present disclosure relates generally to wireless communication systems. More specifically, the present disclosure relates to systems and methods for a linear feedback shift register (LFSR).

BACKGROUND

Wireless communication systems are widely deployed to provide various types of communication content such as voice, video, data and so on. These systems may be multiple-access systems capable of supporting simultaneous communication of multiple mobile devices with one or more base stations.

To provide additional security to wireless communications, encryption techniques may be used. Encryption is the process of encoding messages to prevent eavesdroppers/hackers from reading the messages and/or altering the message. Only an authorized party may decode the encrypted messages using a decryption algorithm. Even with encryption/decryption techniques, other techniques may be needed to protect the integrity and authenticity of a message. Benefits may be realized by improved methods for authenticating encrypted messages.

DETAILED DESCRIPTION

Message authentication may be used in wireless communications to provide integrity and authenticity assurances for a message transmitted wirelessly. This message authentication may include generating a message authentication code (MAC) using a universal hash function. The universal hash function uses a key (in a keystream) to authenticate the input message. The keystream may be generated using a word based odd characteristic linear feedback shift register (LFSR) 458 that includes multiple 32-bit registers. Complex operations, including logical shifting of each bit in a register, may make the linear feedback shift register inefficient. By implementing 64-bit registers in the linear feedback shift register (LFSR), the logical shifting of bits may be performed efficiently. The message authentication code (MAC) may then be used for authenticating a message (either a received message or a message to be transmitted).

In the following description, for reasons of conciseness and clarity, terminology associated with the Long Term Evolution (LTE) standards, as promulgated under the 3rd Generation Partnership Project (3GPP) by the International Telecommunication Union (ITU), is used. It should be noted that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a wireless device can sometimes be called a user equipment, a mobile station, a mobile terminal, a subscriber unit, an access terminal, etc., to name just a few. Likewise, a base station can sometimes be called an access point, a Node B, an evolved Node B, and so forth. It here should be noted that different terminologies apply to different technologies when applicable.

Figure 1:
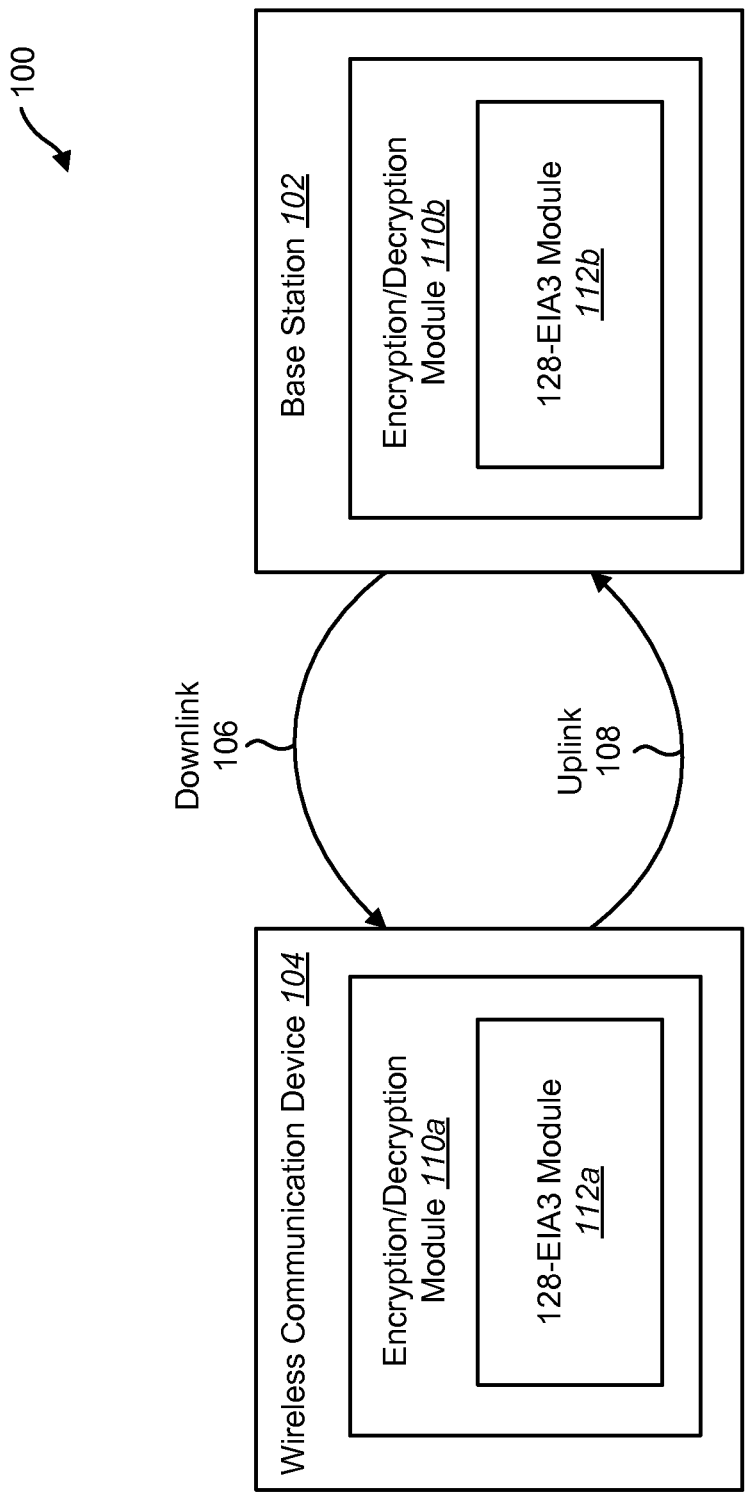
FIG. 1 shows a wireless communication system with multiple wireless devices.

FIG. 1 shows a wireless communication system 100 with multiple wireless devices. Wireless communication systems 100 are widely deployed to provide various types of communication content such as voice, data and so on. A wireless device may be a base station 102 or a wireless communication device 104. Both the base station 102 and the wireless communication device 104 may be configured to authenticate encrypted messages (e.g., to provide authentication to transmitted messages and to obtain authentication for received messages). Authenticating encrypted messages may be performed using a linear feedback shift register (LFSR). In one configuration, a 32-bit (or shorter) linear feedback shift register (LFSR) may be implemented using 64-bit registers.

A base station 102 is a station that communicates with one or more wireless communication devices 104. A base station 102 may also be referred to as, and may include some or all of the functionality of, an access point, a broadcast transmitter, a NodeB, an evolved NodeB, etc. The term "base station" will be used herein. Each base station 102 provides communication coverage for a particular geographic area. A base station 102 may provide communication coverage for one or more wireless communication devices 104. The term "cell" can refer to a base station 102 and/or its coverage area depending on the context in which the term is used.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink and downlink transmissions are in the same frequency region so that the reciprocity principle allows the estimation of the downlink channel from the uplink channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

In 3GPP Long Term Evolution (LTE), a wireless communication device 104 may be referred to as a "user equipment" (UE). A wireless communication device 104 may also be referred to as, and may include some or all of the functionality of, a terminal, an access terminal, a subscriber unit, a station, etc. A wireless communication device 104 may be a cellular phone, a personal digital assistant (PDA), a wireless device, a wireless modem, a handheld device, a laptop computer, etc.

A wireless communication device 104 may communicate with zero, one or multiple base stations 102 on the downlink 106 and/or uplink 108 at any given moment. The downlink 106 (or forward link) refers to the communication link from a base station 102 to a wireless communication device 104, and the uplink 108 (or reverse link) refers to the communication link from a wireless communication device 104 to a base station 102.

Both the wireless communication device 104 and the base station 102 may include an encryption/decryption module 110a-b. An encryption/decryption module 110 may allow for encryption and decryption of messages sent wirelessly between the wireless communication device 104 and the base station 102. For example, the encryption/decryption module 110a may allow the wireless communication device 104 to encrypt a message. The encrypted message may then be transmitted via the uplink 108 to the base station 102. The base station 102 may use the encryption/decryption module 110b to decrypt the message.

When using encrypted messages, authentication procedures may be used to authenticate a message and to detect forgery. Authentication procedures may include inserting authentication into a message prior to transmission and verifying the authentication of received messages. An encryption/decryption module 110 may include a 128-EIA3 module 112a-b. The 128-EIA3 module 112 may perform authentication procedures for encrypted messages (e.g., inserting authentication prior to transmission and obtaining authentication for received messages).

Within the security architecture of the LTE system, there are standardized algorithms for confidentiality and integrity. Two sets of algorithms (128-EEA1/128-EIA1 and 128-EEA2/128-EIA2) have already been specified (in Specification of the 3GPP Confidentiality and Integrity Algorithms; Document 1: f8 and f9 specifications; (3GPP TS35.201 Release 6) and 3GPP System Architecture Evolution (SAE); Security architecture; (3GPP TS33.401 Release 9)). 128-EIA3 applies a third algorithm for integrity (i.e., authentication) based on a stream cipher (ZUC). The 128-EIA3 algorithm may compute a 32-bit message authentication code (MAC) of a given input message using an integrity key (IK). The core algorithms adopted by the message authentication code (MAC) are a universal hash and the stream cipher (ZUC). The 128-EIA3 algorithm thus computes the message authentication code (MAC) in software requiring one 32-bit XOR instruction per message bit. The 128-EIA3 algorithm may provide protection against a large array of side-channel attacks such as timing and power analysis attacks, improving the physical security of the wireless communication system 100. The 128-EIA3 algorithm may execute in wall clock time that is independent of the message bit values.

Figure 2:
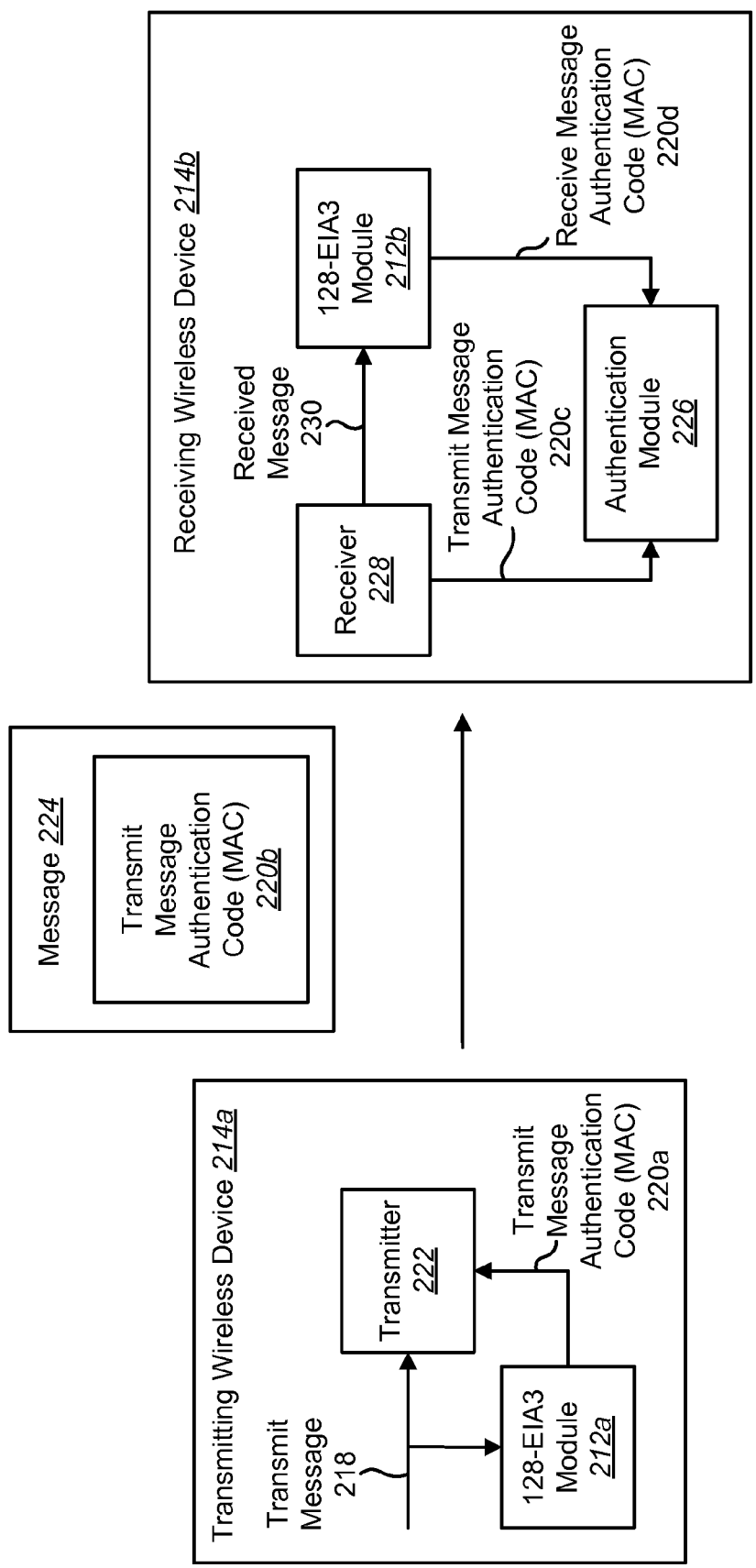
FIG. 2 is a block diagram illustrating authentication procedures between a transmitting wireless device and a receiving wireless device.

FIG. 2 is a block diagram illustrating authentication procedures between a transmitting wireless device 214a and a receiving wireless device 214b. The transmitting wireless device 214a may be either a wireless communication device 104 or a base station 102. The receiving wireless device 214b may be either a wireless communication device 104 or a base station 102. The authentication procedures in both the transmitting wireless device 214a and the receiving wireless device 214b may use the 128-EIA3 algorithm.

The transmitting wireless device 214a may obtain a transmit message 218 (i.e., by generating the transmit message 218). The transmit message 218 may be provided to a 128-EIA3 module 212a. Using the transmit message 218, the 128-EIA3 module 212a may output a transmit message authentication code (MAC) 220a. Both the transmit message 218 and the transmit message authentication code (MAC) 220a may be provided to a transmitter 222. The transmitter 222 may combine the transmit message 218 and the transmit message authentication code (MAC) 220a to obtain a message 224. The transmitter 222 may then transmit the message 224 (along with the transmit message authentication code (MAC) 220b).

The receiving wireless device 214b may obtain the message 224 (i.e., by receiving the message 224 using a receiver 228). The receiver 228 may extract the transmit message authentication code (MAC) 220c from the message 224. The receiver 228 may provide the transmit message authentication code (MAC) 220c to an authentication module 226. The receiver 228 may also provide the received message 230 to a 128-EIA3 module 212b. The 128-EIA3 module 212b may use the received message 230 to compute a receive message authentication code (MAC) 220d. The 128-EIA3 module 212b may provide the receive message authentication code (MAC) 220d to the authentication module 226. The authentication module 226 may then compare the transmit message authentication code (MAC) 220c and the receive message authentication code (MAC) 220d to determine whether the message 224 received is authentic.

A message authentication code (MAC) algorithm (such as the 128-EIA3 algorithm) may also be referred to as a keyed (cryptographic) hash function. A message authentication code (MAC) algorithm may accept as input a secret key and an arbitrary-length message to be authenticated (e.g., the transmit message 218 or the received message 230) and output a message authentication code (MAC) 220 tag. Using a message authentication code (MAC) algorithm may protect both the data integrity and the authenticity of a message 224, since the receiving wireless device 214b can detect any changes to the message content (such as forgeries).

Figure 3:
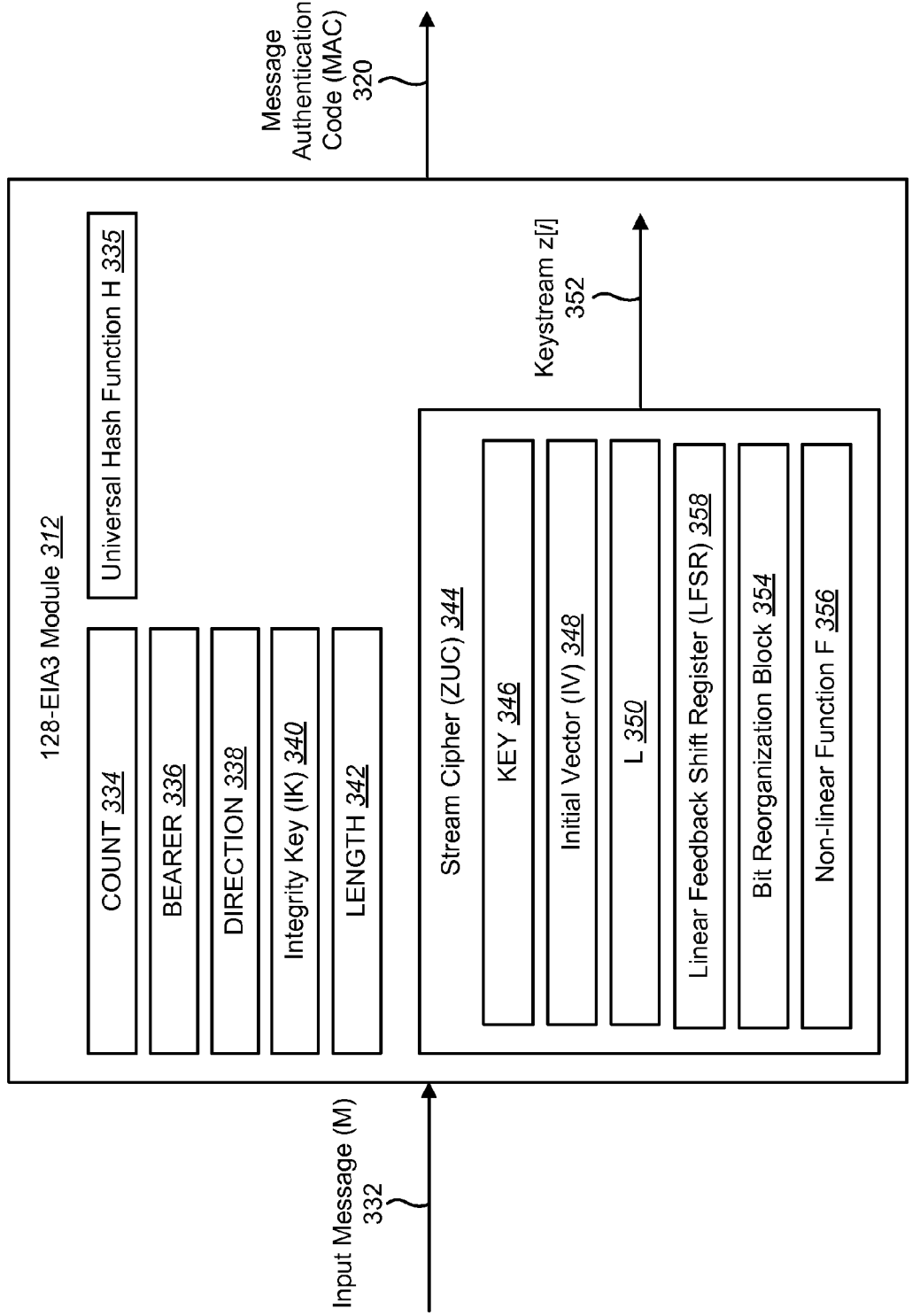
FIG. 3 is a block diagram illustrating a 128-EIA3 module for use in the present systems and methods.

FIG. 3 is a block diagram illustrating a 128-EIA3 module 312 for use in the present systems and methods. The 128-EIA3 module 312 of FIG. 3 may be one configuration of the 128-EIA3 modules 112a-b of FIG. 1. The 128-EIA3 module 312 may receive an input message (M) 332 and output a message authentication code (MAC) 320. The 128-EIA3 module 312 may thus apply a 128-EIA3 algorithm to the input message (M) 332 to obtain a message authentication code (MAC) 320 (and thus provide/obtain authentication for the input message (M) 332). Portions of the input message (M) 332 may be used along with the keystream 352 to generate the message authentication code (MAC) 320.

The 128-EIA3 module 312 may include a counter COUNT 334 that is 32-bits. The 128-EIA3 module 312 may also include a bearer identity BEARER 336 that is 3-bits. The 128-EIA3 module 312 may further include the direction of transmission DIRECTION 338, which is 1-bit. The 128-EIA3 module 312 may also include an integrity key (IK) 340 that is 128-bits. The LENGTH 342 of the input message (M) 332 may be 32-bits (i.e., the 32-bit LENGTH 342 may use 32-bits to indicate the length of the input message (M) 332). For example, the LENGTH 342 indicates the number of bits of the input message (M) 332 (between 1 and 65,504 bits). The message authentication code (MAC) 320 output by the 128-EIA3 module 312 may be 32-bits.

The 128-EIA3 module 312 may also include a word-oriented stream cipher (ZUC) 344. The stream cipher (ZUC) 344 may take a 128-bit initial key (KEY) 346 and a 128-bit initial vector (IV) 348 as inputs and output a keystream z[i] 352 of 32-bit words (where each 32-bit word is called a key-word). The number of key-words generated by the stream cipher (ZUC) 344 may be defined by the variable L 350. The keystream 352 may be used for encryption/decryption.

The stream cipher (ZUC) 344 may also include a linear feedback shift register (LFSR) 358. The linear feedback shift register (LFSR) 358 may be a shift register with an input that is a linear function of the previous state of the linear feedback shift register (LFSR) 358. The linear feedback shift register (LFSR) 358 may include multiple registers (also referred to as cells). For example, the linear feedback shift register (LFSR) 358 may include sixteen registers. A register in a linear feedback shift register (LFSR) 358 is typically 32-bits. However, benefits may be realized by using larger registers in the linear feedback shift register (LFSR) 358. For example, using 64-bit registers may allow the linear feedback shift register (LFSR) 358 to perform bit shifting of a 31-bit number with minimal complexity (e.g., without rotating bits). The shifted values in the linear feedback shift register (LFSR) 358 may be added as just integers without requiring reduction. The linear feedback shift register (LFSR) 358 is discussed in additional detail below in relation to FIG. 4.

The stream cipher (ZUC) 344 may further include a bit reorganization block 354. The bit reorganization block 354 may extract 128 bits from the registers of the linear feedback shift register (LFSR) 358 and form four 32-bit words. The first three words extracted may be used to form the input for the linear feedback shift register (LFSR) 358. The final word may be used to generate the keystream 352.

The stream cipher (ZUC) 344 may also include a non-linear function F 356. The non-linear function F 356 may receive the first three words extracted by the bit reorganization block 354. The non-linear function F 356 may output a 32-bit word W, which is used to initialize the linear feedback shift register (LFSR) 358.

Figure 4:
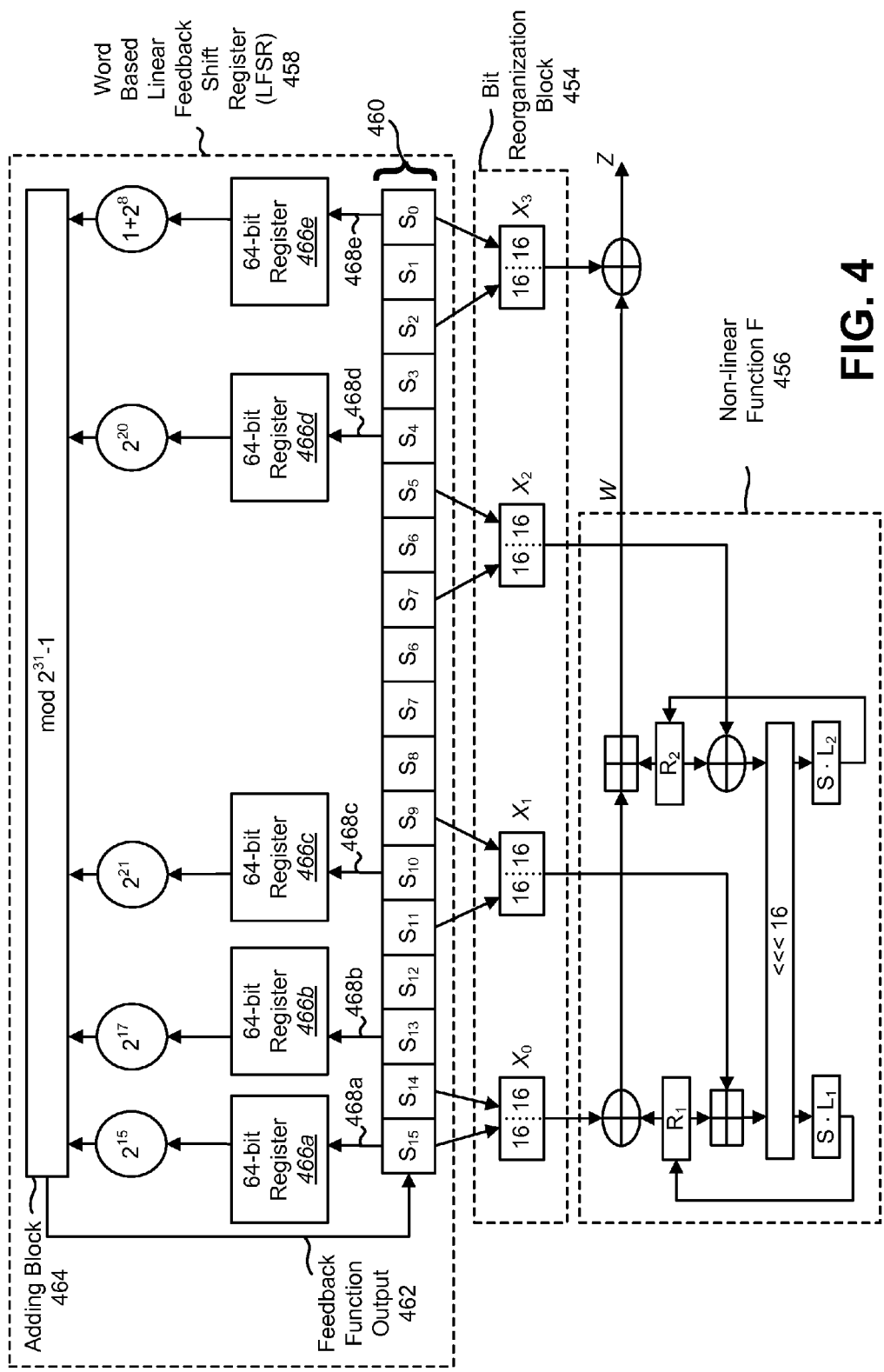
FIG. 4 is a block diagram of a word based linear feedback shift register (LFSR), a bit reorganization block and a non-linear function F.

FIG. 4 is a block diagram of a word based linear feedback shift register (LFSR) 458, a bit reorganization block 454 and a non-linear function F 456. The word based linear feedback shift register (LFSR) 458, bit reorganization block 454 and non-linear function F 456 may be part of a stream cipher (ZUC) 344 used to generate a keystream 352. The word based linear feedback shift register (LFSR) 458 may be one using a connection polynomial with coefficients in a finite field of odd characteristic (not binary, e.g., modulo 3, modulo 5, modulo 7).

The word based linear feedback shift register (LFSR) 458 may include sixteen 32-bit registers (S0, S1, . . . , S15) 460. Each register 460 may be restricted to take values from the set $\{1, 2, 3, \ldots, 2^{31}-1\}$. The S15 register 460 may be referred to as the highest register 460 while the S0 register 460 may be referred to as the lowest register.

When a variable is broken down into a number of substrings (as used in the equations below), the leftmost substring is [0], the next most significant substring is [1] and so on through to the least significant substring. The subscript 2 (e.g., $000_2$) is used to indicate a number in binary representation. The notation a∥b is used to indicate the concatenation of substrings a and b. The notation ⌈x⌉ refers to the smallest integer no less than x.

The word based linear feedback shift register (LFSR) 458 may have two modes of operation: initialization mode and working mode. In initialization mode, the word based linear feedback shift register (LFSR) 458 may receive a 31-bit word u, which is obtained by removing the rightmost bit from a 32-bit output W of the non-linear function F 456. Thus, u=W>>1. More specifically, the initialization begins with Equation (1):

$$v = 2^{15}s_{15} + 2^{17}s_{13} + 2^{21}s_{10} + 2^{20}s_4 + (1+2^8)s_0 \bmod(2^{31}-1). \quad (1)$$

Equation (2) is then applied:

$$s_{16} = (v+u) \bmod(2^{31}-1). \quad (2)$$

If $s_{16}=0$, then $s_{16}$ may be set using Equation (3):

$$s_{16} = 2^{31}-1 \quad (3)$$

Equation (4) may then be applied:

$$(s_1, s_2, \ldots, s_{15}, s_{16}) \rightarrow (s_0, s_1, \ldots, s_{14}, s_{15}). \quad (4)$$

In the working mode, the word based linear feedback shift register (LFSR) 458 does not receive any input. In working mode, Equation (5), Equation (6) and Equation (7) may be applied:

$$s_{16} = 2^{15}s_{15} + 2^{17}s_{13} + 2^{21}s_{10} + 2^{20}s_4 + (1+2^8)s_0 \bmod(2^{31}-1). \quad (5)$$

If $s_{16}=0$, then $s_{16}$ may be set using Equation (6):

$$s_{16} = 2^{31}-1. \quad (6)$$

Equation (7) may then be applied:

$$(s_1, s_2, \ldots, s_{15}, s_{16}) \rightarrow (s_0, s_1, \ldots, s_{14}, s_{15}). \quad (7)$$

Since the multiplication of a 31-bit string s by $2^i$ over $GF(2^{31}-1)$ can be implemented by a cyclic shift of s to the left by i bits, only addition modulo $2^{31}-1$ is needed in Equation (1) and Equation (5). More precisely, Equation (1) can be implemented using Equation (8):

$$v=(s_{15}<<<_{31}15)+(s_{13}<<<_{31}17)+(s_{10}<<<_{31}21)+ \\ (s_4<<<_{31}20)+(s_0<<<_{31}8)+s_0 \bmod(2^{31}-1). \qquad (8)$$

Prior to performing bit operations on taps 468a-e from the registers 460, the taps 468 may move the bits in certain registers 460 to 64-bit registers 466a-e. Thus, in one configuration, a tap 468a may move the bits from the S15 register 460 to a first 64-bit register 466a, a tap 468b may move the bits from the S13 register 460 to a second 64-bit register 466b, a tap 468c may move the bits from the S10 register 460 to a third 64-bit register 466c, a tap 468d may move the bits from the S4 register 460 to a fourth 64-bit register 466d and a tap 468e may move the bits from the S0 register 460 to a fifth 64-bit register 466e. Thus, the 32-bit values of each of the taps 468 are placed into 64-bit registers 466.

As part of the word based linear feedback shift register (LFSR) 458, multiplications by the connection polynomial coefficients (e.g., $2^{15}$, $2^{17}$, $2^{21}$, $2^{20}$ and $1+2^8$) may be performed on the 32-bit values in the 64-bit registers 466 (by simply shifting (e.g., logically shifting) each of the bits according to the desired shift). In a typical linear feedback shift register (LFSR) that does not include 64-bit registers 466, such multiplications are achieved by 31-bit cyclic shifts and may require increased complexity and a larger number of computations. Thus, by using 64-bit registers in the word based linear feedback shift register (LFSR) 458, the complexity may be reduced and the number of computations required to generate a keystream 352 may be reduced.

Once the 32-bit values in each of the 64-bit registers 466 have been shifted, the shifted values may be added in an adding block 464 (that also performs a modular reduction) using simple addition to obtain the feedback function output 462. The feedback function output 462 may be shifted back into the highest register 460 (i.e., the S15 register 460).

Within the adding block 464, the accumulated value is at most 53 bits. D may be set as the 64-bit value (after accumulation but before reduction in the adding block 464). D may be referenced using Equation (9):

$$D=H\|L. \qquad (9)$$

In Equation (9), D is the concatenation of two 32-bit words H and L, where H has the most significant bits (at most 21 bits) and L has the least significant bits. The 64 bits in D may be reduced in the adding block 464 by applying Equation (10):

$$L=(D>>31)+(L \& 0x7FFFFFFF). \qquad (10)$$

In Equation (10), + refers to addition of integers, & denotes a logical AND, and the constant 0x7FFFFFFF is equal to $2^{32}-1$ written in C-like hexadecimal notation. For general 64-bit values, the first line is not correct, since the result may not fit into 32 bits. This works because (D>>31) is at most 22 bits, and therefore the addition with (L & 0x7FFFFFFF) does not overflow. This is a performance improvement for two reasons. First, for generic 64-bit values, the reduction step of Equation (10) needs to be applied three times to the full 64-bit register. Second, the shorter 32-bit register may be useful on some architectures. Modular reduction may be performed only at the end of generating the feedback function output 462.

The bit reorganization block 454 may extract 128 bits from the registers 460 of the word based linear feedback shift register (LFSR) 458 to form four 32-bit words. The first three words (X0, X1 and X2) may be used by the non-linear function F 456 and the last word (X3) may be used in producing the keystream 352. In the bit reorganization block 454, $X_0=s_{15H}\|s_{14L}$, $X_1=s_{11L}\|s_{9H}$, $X_2=s_{7L}\|s_{5H}$ and $X_3=s_{2L}\|s_{0H}$. The $s_i$ are 31-bit integers, so $s_i$ means bits 30 ... 15 and not 31 ... 16 of $s_i$, for $0 \leq i \leq 15$.

The non-linear function F 456 includes two 32-bit memory cells R1 and R2. The non-linear function F 456 may receive as inputs X0, X1 and X2 from the bit reorganization block 454. The non-linear function F 456 may output a 32-bit word W. The detailed process of the non-linear function F 456 is described in Equation (11):

$$W=(X_0 \oplus R_1) \boxplus R_2;$$

$$W_1=R_1 \boxplus X_1;$$

$$W_2=(R_2 \oplus X_2);$$

$$R_1=S(L_1(W_{1L}\|W_{2H}))$$

$$R_2=S(L_2(W_{2L}\|W_{1H})); \qquad (11)$$

In Equation (11), S is a 32×32 S-box and L1 and L2 are linear transforms. A 32×32 S-box includes four juxtaposed 8×8 S-boxes (i.e., $S=(S_0, S_1, S_2, S_3)$, where $S_0=S_2$ and $S_1=S_3$. The S-boxes are defined in the Specification of the 3GPP Confidentiality and Integrity Algorithms 128-EEA3 & 128-EIA3. Document 2: ZUC Specification. The linear transform L1 is defined according to Equation (12):

$$L_1(X)=X \oplus (X<<<_{32}2) \oplus (X<<<_{32}10) \oplus \\ (X<<<_{32}18) \oplus (X<<<_{32}24). \qquad (12)$$

The linear transform L2 is defined according to Equation (13):

$$L_2(X)=X \oplus (X<<<_{32}8) \oplus (X<<<_{32}14) \oplus \\ (X<<<_{32}22) \oplus (X<<<_{32}30). \qquad (13)$$

The key loading procedure may expand the initial key and the initial vector into sixteen 31-bit integers as the initial state of the linear feedback shift register (LFSR) 458. The 128-bit initial key k may be defined using Equation (14):

$$k=k_0\|k_1\|k_2\| \ldots \|k_{15}. \qquad (14)$$

The 128-bit initial vector iv may be defined using Equation (15):

$$iv=iv_0\|iv_1\|iv_2\| \ldots \|iv_{15}. \qquad (15)$$

In Equation (14) and Equation (15), $k_i$ and $iv_i$, $0 \leq i \leq 15$ are all bytes. The $k_i$ and $iv_i$ are loaded to the registers 460 $s_0$, $s_1, \ldots, s_{15}$ of the linear feedback shift register (LFSR) 458 according to Equation (16):

$$D=d_0\|d_1\| \ldots \|d_{15}. \qquad (16)$$

In Equation (16), $d_0=1000100110101 11_2$, $d_1=0100110101111 00_2$, $d_2=1100010011010 11_2$, $d_3=0010011010111 10_2$, $d_4=1010111100010 01_2$, $d_5=0110101111000 10_2$, $d_6=1110001001101 01_2$, $d_7=0001001101011 11_2$, $d_8=1001101011110 00_2$, $d_9=0101110001001 1_2$, $d_{10}=1101011110001 00_2$, $d_{11}=0011010111100 01_2$, $d_{12}=1011110001001 10_2$, $d_{13}=0111100010011 01_2$, $d_{13}=0111100010011 01_2$, $d_{14}=1111000100110 10_2$ and $d_{15}=1000111101011 00_2$.

Figure 5:
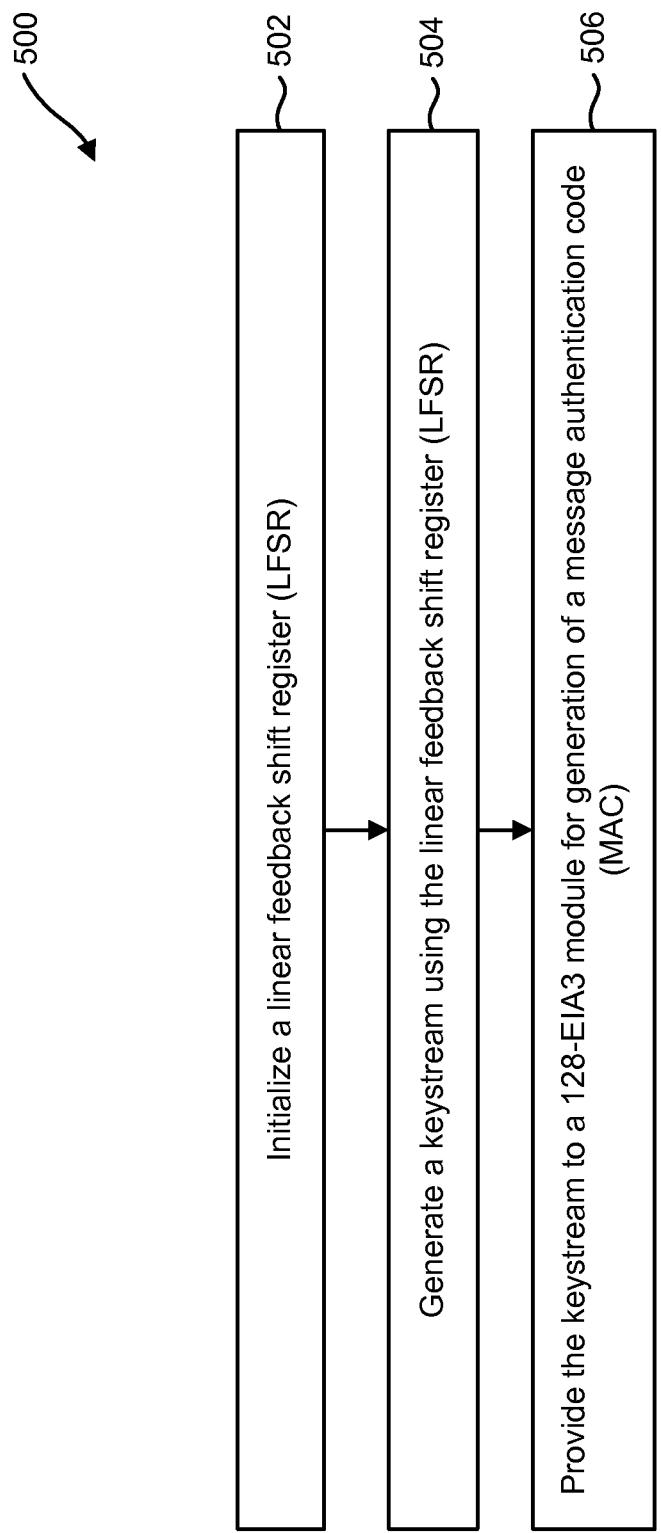
FIG. 5 is a flow diagram of a method for generating a keystream.

FIG. 5 is a flow diagram of a method 500 for generating a keystream 352. The method may be performed by a wireless device 214 such as a base station 102 or a wireless communication device 104. The wireless device 214 may include a 128-EIA3 module 312 that uses a stream cipher (ZUC) 344 to generate a keystream 352. In one configuration, the stream cipher (ZUC) may include a linear feedback shift register (LFSR) 358 that uses 64-bit registers 460.

The wireless device 214 may initialize 502 a linear feedback shift register (LFSR) 358. The wireless device 214 may generate 504 a keystream 352 using the linear feedback shift register (LFSR) 358. The wireless device 214 may provide 506 the keystream 352 to a 128-EIA3 module 312 for generation of a message authentication code (MAC) 320.

Figure 6:
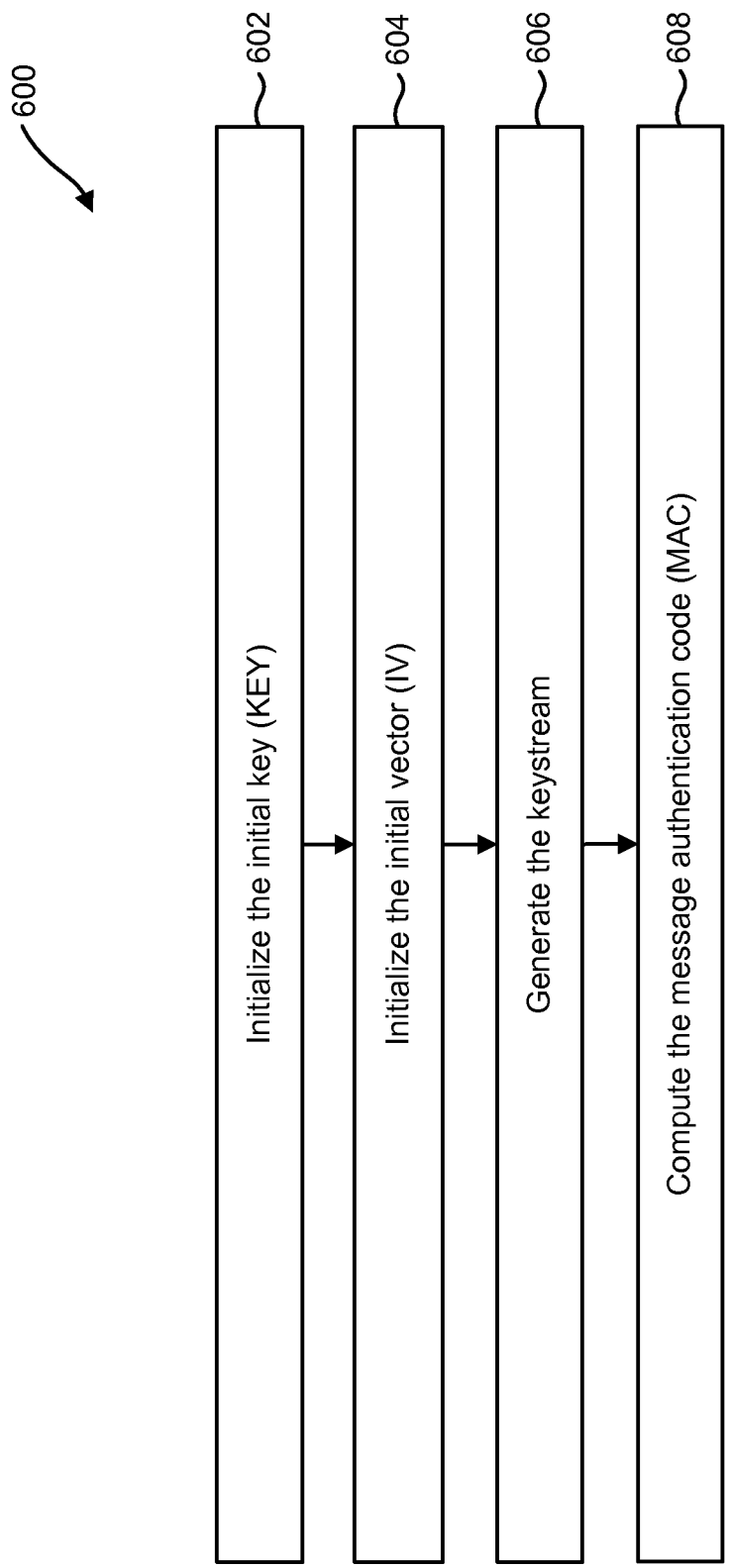
FIG. 6 is a flow diagram of a method for computing a message authentication code (MAC) using an input message (M)

FIG. 6 is a flow diagram of a method 600 for computing a message authentication code (MAC) 320 using an input message (M) 332. The method 600 may be performed by a 128-EIA3 module 312 on a wireless device 214 such as a base station 102 or a wireless communication device 104.

The wireless device 214 may initialize 602 the initial key (KEY) 346 and initialize 604 the initial vector (IV) 348 with the integrity key (IK) 340 and initialization variables before the generation of the keystream 352. The 128-bit integrity key (IK) 340 may be defined using Equation (17):

$$IK=IK[0]\|IK[1]\|IK[2]\|\ldots\|IK[15]. \quad (17)$$

In Equation (17), IK[i] (0≤i≤15) are bytes. The 128-bit initial key (KEY) 346 to the stream cipher (ZUC) 344 may be set using Equation (18):

$$KEY=KEY[0]\|KEY[1]\|KEY[2]\|\ldots\|KEY[15]. \quad (18)$$

In Equation (18), KEY[i] (0≤i≤15) are bytes. Thus, the initial key (KEY) 346 may be initialized 602 using Equation (19):

$$KEY[i]=IK[i], i=0,1,2,\ldots,15. \quad (19)$$

In Equation (19), each substring of the initial key (KEY) 346 is set equal to each corresponding substring of the integrity key (IK) 340. The 32-bit counter COUNT 334 may be defined using Equation (20):

$$COUNT=COUNT[0]\|COUNT[1]\|COUNT[2]\|COUNT[3]. \quad (20)$$

In Equation (20), COUNT [i], i=0, 1, 2, 3 are bytes. The 128-bit initial vector (IV) 348 may be defined using Equation (21):

$$IV=IV[0]\|IV[1]\|IV[2]\|\ldots\|IV[15]. \quad (21)$$

In Equation (21), IV[i] (0≤i≤15) are bytes. The initial vector (IV) 348 may then be initialized 604 using Equation (22):

$$IV[0]=COUNT[0], IV[1]=COUNT[1],$$

$$IV[2]=COUNT[2], IV[3]=COUNT[3],$$

$$IV[4]=BEARER\|000_2, IV[5]=00000000_2,$$

$$IV[6]=00000000_2, IV[7]=00000000_2,$$

$$IV[8]=IV[0]\oplus(DIRECTION<<7), IV[9]=IV[1],$$

$$IV[10]=IV[2], IV[11]=IV[3],$$

$$IV[12]=IV[4], IV[13]=IV[5],$$

$$IV[14]=IV[6]\oplus(DIRECTION<<7), IV[15]=IV[7]. \quad (22)$$

In Equation (22), ⊕ refers to an exclusive-OR operation and a<<t refers to a left shift of integer a by t bits. Thus, DIRECTION<<7 refers to shifting the DIRECTION 338 to the left 7 bits.

The wireless device 214 may then generate 606 the keystream 352. The stream cipher (ZUC) 344 may generate a keystream 352 with L 350 key-words, where $$L=\left\lceil\frac{LENGTH}{32}\right\rceil+2 \text{ words}.$$

The keystream 352 may be denoted by z[0], z[1], ..., z[32×(L−1)], where z[0] is the most significant bit of the first output word of the stream cipher (ZUC) 344 and z[31] is the least significant bit. For each i=0, 1, 2, ..., 32×(L−1), Equation (23) may be applied:

$$z_i=z[i]\|z[i+1]\|\ldots\|z[i+31]. \quad (23)$$

Thus, each $z_i$ of the keystream 352 is a 32-bit word. T may be defined as a 32-bit word. T may be initially set equal to 0. For each i=0, 1, 2, ..., LENGTH−1, if M[i]=1 then Equation (24) is applied:

$$T=T\oplus z_i. \quad (24)$$

Equation (24) may be referred to as a universal hash function H. The output message authentication code (MAC) 320 is then computed 608 according to Equation (25):

$$MAC=T\oplus z_{32(L-1)}. \quad (25)$$

Figure 7:
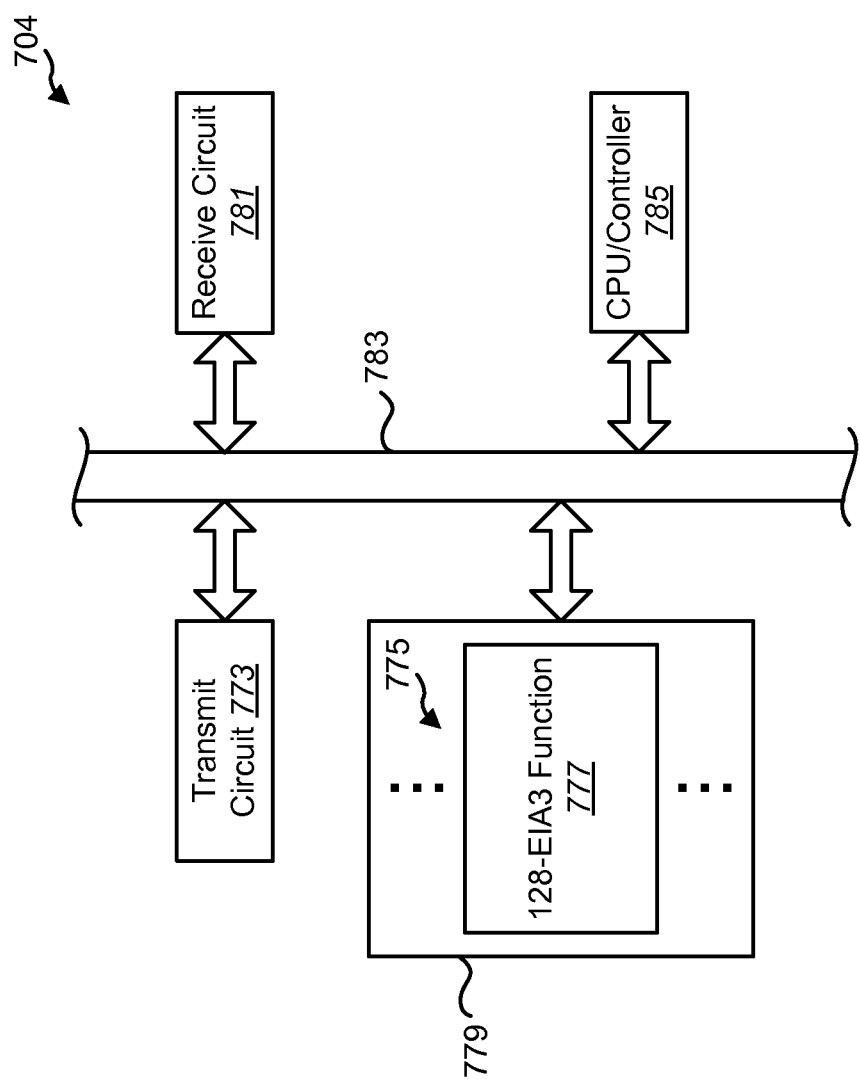
FIG. 7 illustrates certain components that may be included within a wireless communication device.

FIG. 7 shows part of a hardware implementation of a wireless communication device 704 for executing the schemes or processes as described above. The wireless communication device 704 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 7.

The wireless communication device 704 includes a central data bus 783 linking several circuits together. The circuits include a CPU (central processing unit) or a controller 785, a receive circuit 781, a transmit circuit 773, and a memory unit 779.

The receive circuit 781 and the transmit circuit 773 can be connected to an RF (radio frequency) circuit (which is not shown in the drawing). The receive circuit 781 processes and buffers received signals before sending the signals out to the data bus 783. On the other hand, the transmit circuit 773 processes and buffers the data from the data bus 783 before sending the data out of the wireless communication device 704. The CPU/controller 785 performs the function of data management of the data bus 783 and furthers the function of general data processing, including executing the instructional contents of the memory unit 779.

The memory unit 779 includes a set of modules and/or instructions generally signified by the reference numeral 775. In this embodiment, the modules/instructions include, among other things, a 128-EIA3 function 777 which carries out the schemes and processes as described above. The function 777 includes computer instructions or code for executing the process steps as shown and described in FIGS. 1-6. Specific instructions particular to an entity can be selectively implemented in the function 777.

In this embodiment, the memory unit 779 is a RAM (random access memory) circuit. The exemplary functions, such as the function 777, include one or more software routines, modules and/or data sets. The memory unit 779 can be tied to another memory circuit (not shown) which can be either volatile or nonvolatile. As an alternative, the memory unit 779 can be made of other circuit types, such as an EEPROM (electrically erasable programmable read only memory), an EPROM (electrical programmable read only memory), a ROM (read only memory), an ASIC (application specific integrated circuit), a magnetic disk, an optical disk, and others well known in the art.

Figure 8:
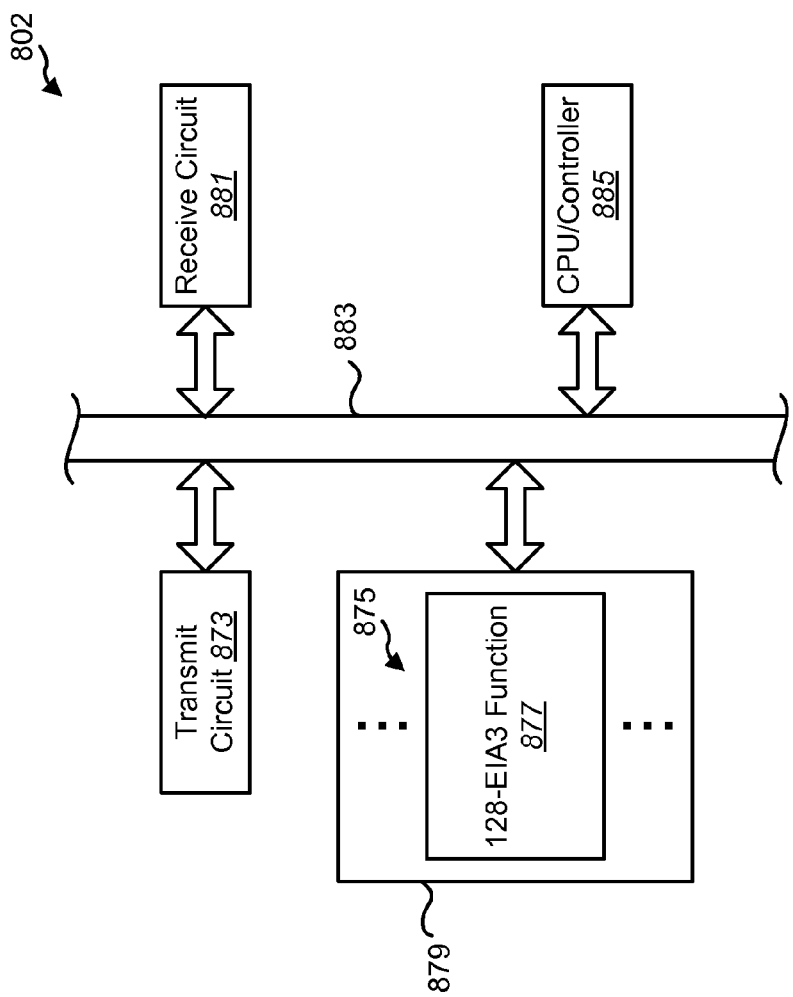
FIG. 8 illustrates certain components that may be included within a base station.

FIG. 8 shows part of a hardware implementation of a base station 802 for executing the schemes or processes as described above. The base station 802 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 8.

The base station 802 includes a central data bus 883 linking several circuits together. The circuits include a CPU (central processing unit) or a controller 885, a receive circuit 881, a transmit circuit 873, and a memory unit 879.

The receive circuit 881 and the transmit circuit 873 can be connected to an RF (radio frequency) circuit (which is not shown in the drawing). The receive circuit 881 processes and buffers received signals before sending the signals out to the data bus 883. On the other hand, the transmit circuit 873 processes and buffers the data from the data bus 883 before sending the data out of the base station 802. The CPU/controller 885 performs the function of data management of the data bus 883 and furthers the function of general data processing, including executing the instructional contents of the memory unit 879.

The memory unit 879 includes a set of modules and/or instructions generally signified by the reference numeral 875. In this embodiment, the modules/instructions include, among other things, a 128-EIA3 function 877 which carries out the schemes and processes as described above. The function 877 includes computer instructions or code for executing the process steps as shown and described in FIGS. 1-6. Specific instructions particular to an entity can be selectively implemented in the function 877.

In this embodiment, the memory unit 879 is a RAM (random access memory) circuit. The exemplary functions, such as the function 877, include one or more software routines, modules and/or data sets. The memory unit 879 can be tied to another memory circuit (not shown) which can be either volatile or nonvolatile. As an alternative, the memory unit 879 can be made of other circuit types, such as an EEPROM (electrically erasable programmable read only memory), an EPROM (electrical programmable read only memory), a ROM (read only memory), an ASIC (application specific integrated circuit), a magnetic disk, an optical disk, and others well known in the art.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

No claim element is to be construed under the provisions of 35 U.S.C. §112, sixth paragraph, unless the element is expressly recited using the phrase "means for" or, in the case of a method claim, the element is recited using the phrase "step for."

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 7 and FIG. 8.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 5 and FIG. 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A wireless device, comprising:
  a word based odd characteristic linear feedback shift register that comprises:
  means for initializing the linear feedback shift register;
  means for generating a feedback function output, wherein modular reduction is performed only at the end of generating the feedback function output; and
  means for placing the feedback function output into a highest register of the linear feedback shift register.

2. The wireless device of claim 1, wherein the linear feedback shift register comprises multiple 64-bit registers.

3. The wireless device of claim 2, wherein each 64-bit register receives a tap from a 32-bit register on the linear feedback shift register.

4. The wireless device of claim 2, wherein the 64-bit registers allow for logical shifting by shifting each bit.

5. The wireless device of claim 2, wherein the feedback function output is generated using logical shifting, addition and modular reduction.

6. The wireless device of claim 2, wherein the feedback function output is generated using modulo N arithmetic operations in each 64-bit register, and wherein N is 32 bits or shorter.

7. The wireless device of claim 2, wherein the linear feedback shift register is part of a stream cipher.

8. The wireless device of claim 7, wherein the stream cipher is used in a 128-EIA3 algorithm.

9. The wireless device of claim 2, wherein the linear feedback shift register provides bits to a bit reorganization block.

10. The wireless device of claim 2, wherein the linear feedback shift register comprises five 64-bit registers.

11. The wireless device of claim 2, wherein each 64-bit register comprises a 32-bit value.

12. The wireless device of claim 2, wherein logical shifts to the left are performed for each 64-bit register without performing a reduction.

13. The wireless device of claim 2, wherein the linear feedback shift register is used in a wireless communication device.

14. The wireless device of claim 2, wherein the linear feedback shift register is used in a base station.

15. An apparatus, comprising:
  circuitry configured to initialize a linear feedback shift register, to generate a feedback function output, wherein modular reduction is performed only at the end of generating the feedback function output, and to place the feedback function output into a highest register of the linear feedback shift register, wherein the linear feedback shift register is a word based odd characteristic linear feedback shift register.

16. The apparatus of claim 15, wherein the linear feedback shift register comprises multiple 64-bit registers.

17. The apparatus of claim 16, wherein each 64-bit register receives a tap from a 32-bit register on the linear feedback shift register.

18. The apparatus of claim 16, wherein the 64-bit registers allow for logical shifting by shifting each bit.

19. The apparatus of claim 16, wherein the feedback function output is generated using logical shifting, addition and modular reduction.

20. The apparatus of claim 16, wherein the feedback function output is generated using modulo N arithmetic operations in each 64-bit register, and wherein N is 32 bits or shorter.

21. The apparatus of claim 16, wherein the linear feedback shift register is part of a stream cipher.

22. The apparatus of claim 21, wherein the stream cipher is used in a 128-EIA3 algorithm.

23. The apparatus of claim 16, wherein the linear feedback shift register provides bits to a bit reorganization block.

24. The apparatus of claim 16, wherein the linear feedback shift register comprises five 64-bit registers.

25. The apparatus of claim 16, wherein each 64-bit register comprises a 32-bit value.

26. The apparatus of claim 16, wherein logical shifts to the left are performed for each 64-bit register without performing a reduction.

27. The apparatus of claim 16, wherein the linear feedback shift register is used in a wireless communication device.

28. The apparatus of claim 16, wherein the linear feedback shift register is used in a base station.

29. A method, comprising:
  initializing a linear feedback shift register, wherein the linear feedback shift register is a word based odd characteristic linear feedback shift register;
  generating a feedback function output, wherein modular reduction is performed only at the end of generating the feedback function output; and
  placing the feedback function output into a highest register of the linear feedback shift register.

30. The method of claim 29, wherein the linear feedback shift register comprises multiple 64-bit registers.

31. The method of claim 30, wherein each 64-bit register receives a tap from a 32-bit register on the linear feedback shift register.

32. The method of claim 30, wherein the 64-bit registers allow for logical shifting by shifting each bit.

33. The method of claim 30, wherein the feedback function output is generated using logical shifting, addition and modular reduction.

34. The method of claim 30, wherein the feedback function output is generated using modulo N arithmetic operations in each 64-bit register, and wherein N is 32 bits or shorter.

35. The method of claim 30, wherein the linear feedback shift register is part of a stream cipher.

36. The method of claim 35, wherein the stream cipher is used in a 128-EIA3 algorithm.

37. The method of claim 30, wherein the linear feedback shift register provides bits to a bit reorganization block.

38. The method of claim 30, wherein the linear feedback shift register comprises five 64-bit registers.

39. The method of claim 30, wherein each 64-bit register comprises a 32-bit value.

40. The method of claim 30, wherein logical shifts to the left are performed for each 64-bit register without performing a reduction.

41. The method of claim 30, wherein the linear feedback shift register is used in a wireless communication device.

42. The method of claim 30, wherein the linear feedback shift register is used in a base station.

43. A non-transitory computer-readable medium having instructions thereon, the instructions comprising:

code for causing a wireless device to initialize a linear feedback shift register, wherein the linear feedback shift register is a word based odd characteristic linear feedback shift register;

code for causing the wireless device to generate a feedback function output, wherein modular reduction is performed only at the end of generating the feedback function output; and code for causing the wireless device to place the feedback function output into a highest register of the linear feedback shift register.

44. The non-transitory computer-readable medium of claim 43, wherein the linear feedback shift register comprises multiple 64-bit registers.

45. The non-transitory computer-readable medium of claim 44, wherein each 64-bit register receives a tap from a 32-bit register on the linear feedback shift register.

46. The non-transitory computer-readable medium of claim 44, wherein the 64-bit registers allow for logical shifting by shifting each bit.

47. The non-transitory computer-readable medium of claim 44, wherein the feedback function output is generated using logical shifting, addition and modular reduction.

\* \* \* \* \*